US009661187B1

(12) United States Patent
Chen

(10) Patent No.: US 9,661,187 B1
(45) Date of Patent: May 23, 2017

(54) COLOR GAMUT MAPPING METHOD BASED ON COLOR GAMUT OF SOURCE IMAGE

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 103 days.

(21) Appl. No.: 14/781,400

(22) PCT Filed: Aug. 26, 2015

(86) PCT No.: PCT/CN2015/088079
§ 371 (c)(1),
(2) Date: Sep. 30, 2015

(87) PCT Pub. No.: WO2016/206183
PCT Pub. Date: Dec. 29, 2016

(30) Foreign Application Priority Data

Jun. 23, 2015  (CN) .......................... 2015 1 0349382

(51) Int. Cl.
*H04N 1/60* (2006.01)
*G06K 15/02* (2006.01)

(52) U.S. Cl.
CPC ....... *H04N 1/6061* (2013.01); *G06K 15/1878* (2013.01); *H04N 1/6008* (2013.01); *H04N 1/6066* (2013.01)

(58) Field of Classification Search
None
See application file for complete search history.

(56) References Cited

U.S. PATENT DOCUMENTS

| 6,058,208 A * | 5/2000 | Ikeda ................... H04N 1/622 358/518 |
| 6,724,507 B1 * | 4/2004 | Ikegami ............... H04N 1/6058 358/518 |

(Continued)

FOREIGN PATENT DOCUMENTS

| CN | 101895773 A | 11/2010 |
| CN | 102209179 A | 10/2011 |

*Primary Examiner* — Scott A Rogers
(74) *Attorney, Agent, or Firm* — Andrew C. Cheng

(57) ABSTRACT

A color gamut mapping method based on a color gamut of a source image is disclosed. The method comprises: (a) inputting a source image, measuring a grayscale value of each of color sub-pixels corresponding to each pixel point; (b) determining multiple preset target pixel points on the source image based on the grayscale value of each of the color sub-pixels; (c) calculating multiple coordinate values in an uniform chromaticity space corresponding to each of the multiple preset target pixel points; (d) determining a color gamut of the source image based on the multiple coordinate values; (e) extracting a color gamut boundary of a target device to obtain a color gamut; and (f) performing a color gamut mapping between the source image and the target device. In a transfer and reproduce process of image colors, the loss is reduced, gamut mapping effect is better, and effectively reduce the amount of calculation.

5 Claims, 2 Drawing Sheets

(56) References Cited

U.S. PATENT DOCUMENTS

| | | | |
|---|---|---|---|
| 7,177,047 B2* | 2/2007 | Rozzi | H04N 1/6022 |
| | | | 358/1.9 |
| 8,363,267 B2* | 1/2013 | Hong | H04N 1/6058 |
| | | | 358/518 |
| 2005/0206926 A1 | 9/2005 | Tsuji | |
| 2016/0322024 A1* | 11/2016 | Stauder | H04N 1/6063 |

* cited by examiner

COLOR GAMUT MAPPING METHOD BASED ON COLOR GAMUT OF SOURCE IMAGE

BACKGROUND OF THE INVENTION

1. Field of the Invention

The present invention relates to a color gamut mapping technology, and more particularly to a color gamut mapping method based on a color gamut of a source image.

2. Description of Related Art

The conventional color gamut mapping method is a mapping between a color gamut formed by connecting points corresponding to maximum saturation colors of three color components of red/green/blue (R/G/B) in a chromaticity space and a color gamut formed by connecting points corresponding to maximum saturation colors of other display base colors (such as three color components of cyan/magenta/yellow (C/M/Y) for a color printer) in a chromaticity space.

When performing a color gamut mapping, a source color gamut and a target color gamut should be considered. The source color gamut can be a color gamut of a source device or a color gamut of a source image. However, a color gamut mapping based on the color gamut of the source device has a greater loss than a color gamut mapping based on the color gamut of the source image in a transfer and reproduce process. Therefore, in the conventional art, a color gamut mapping between different devices is usually based on the color gamut of the source image in order to obtain a better mapping effect.

The conventional method for determining a color gamut of a source image includes following steps: respectively measuring stimulus matrixes (R(X, Y, Z), G(X, Y, Z), and B(X, Y, Z)) of grayscale of three primary colors of a source image; based on the color mixing principle, calculating and obtaining a stimulus matrix S(X, Y, Z) of grayscale of the source image through the stimulus matrixes R(X, Y, Z), G(X, Y, Z), and B(X, Y, Z); based on a conversion relationship between L*, a*, and b* in CIELAB chromaticity space and the stimulus matrix S(X, Y, Z) of grayscale of the source image, calculating and obtaining coordinate values L*, a*, and b* in the CIELAB chromaticity space of each pixel of the source image; based on the coordinate values L*, a*, and b*, determining the color gamut of the source image. Here, X represents red stimulus amount, Y represents green stimulus amount, Z represents blue stimulus amount, L* represents lightness index, and a* and b* represent chromaticity indexes.

However, the conventional method for determining a color gamut of a source image has to measure stimulus matrixes of grayscale of three primary colors of all pixel points. The method requires a long time, and the amount of calculation is large.

SUMMARY OF THE INVENTION

The embodiment of the present invention is to provide a color gamut mapping method based on a color gamut of a source image in order to solve in a process of performing a color gamut mapping, the amount of calculation greater in determining the color gamut of the source image.

In an embodiment of the present invention, the present invention provides a color gamut mapping method based on a color gamut of a source image, comprising following steps: step (a) inputting a source image, measuring a grayscale value of each of color sub-pixels corresponding to each pixel point; step (b) determining multiple preset target pixel points on the source image based on the grayscale value of each of the color sub-pixels which has been measured; step (c) calculating multiple coordinate values in an uniform chromaticity space corresponding to each of the multiple preset target pixel points; step (d) determining a color gamut of the source image based on the multiple coordinate values; step (e) extracting a color gamut boundary of a target device in order to obtain a color gamut of the target device; and step (f) performing a color gamut mapping between the source image and the target device.

Optionally, the multiple preset target pixel points respectively correspond to vertexes of pure colors of six primary colors in the uniform chromaticity space, and the six primary colors include: a red color, a green color, a blue color, a cyan color, a magenta color, and a yellow color.

Optionally, the multiple preset target pixel points includes six preset target pixel points, the color sub-pixels includes a red color sub-pixel, a green color sub-pixel and a blue color sub-pixel, and the step (b) includes steps of: (b1) setting a pixel point that the grayscale value of a red color sub-pixel is maximum, the grayscale value of a green color sub-pixel is zero, and the grayscale value of a blue sub-pixel is zero as a first preset target pixel point; (b2) setting a pixel point that the grayscale value of a green color sub-pixel is maximum, the grayscale value of a red color sub-pixel is zero, and the grayscale value of a blue sub-pixel is zero as a second preset target pixel point; (b3) setting a pixel point that the grayscale value of a blue color sub-pixel is maximum, the grayscale value of a red color sub-pixel is zero, and the grayscale value of a green sub-pixel is zero as a third preset target pixel point; (b4) calculating a maximum value of a formula of Gray(G)+Gray(B)−Gray(R), and setting a pixel point corresponding to the maximum value of the formula of Gray(G)+Gray(B)−Gray(R) as a fourth preset target pixel point; (b5) calculating a maximum value of a formula of Gray(R)+Gray(B)−Gray(G), and setting a pixel point corresponding to the maximum value of the formula of Gray(R)+Gray(B)−Gray(G) as a fifth preset target pixel point; and (b6) calculating a maximum value of a formula of Gray(R)+Gray(G)−Gray(B), and setting a pixel point corresponding to the maximum value of the formula of Gray(R)+Gray(G)−Gray(B) as a sixth preset target pixel point.

Optionally, the step (d) includes: in the uniform chromaticity space, connecting multiple points corresponding to the multiple coordinate values, and setting a region surrounded and connected by the multiple points as the color gamut of the source image.

Optionally, the step (f) includes: using a gamut clipping method or a gamut compression method for performing the color gamut mapping between the source image and the target device.

Utilizing a color gamut mapping method based on a color gamut of a source image of the present invention, without depending a color gamut of a source device, a mapping between a color gamut of a source image and a color gamut of a target is adopted such that in a transfer and reproduce process of image colors, the loss is reduced so as to improve the effect of the color gamut mapping.

DETAILED DESCRIPTION OF THE PREFERRED EMBODIMENT

Figure 1:
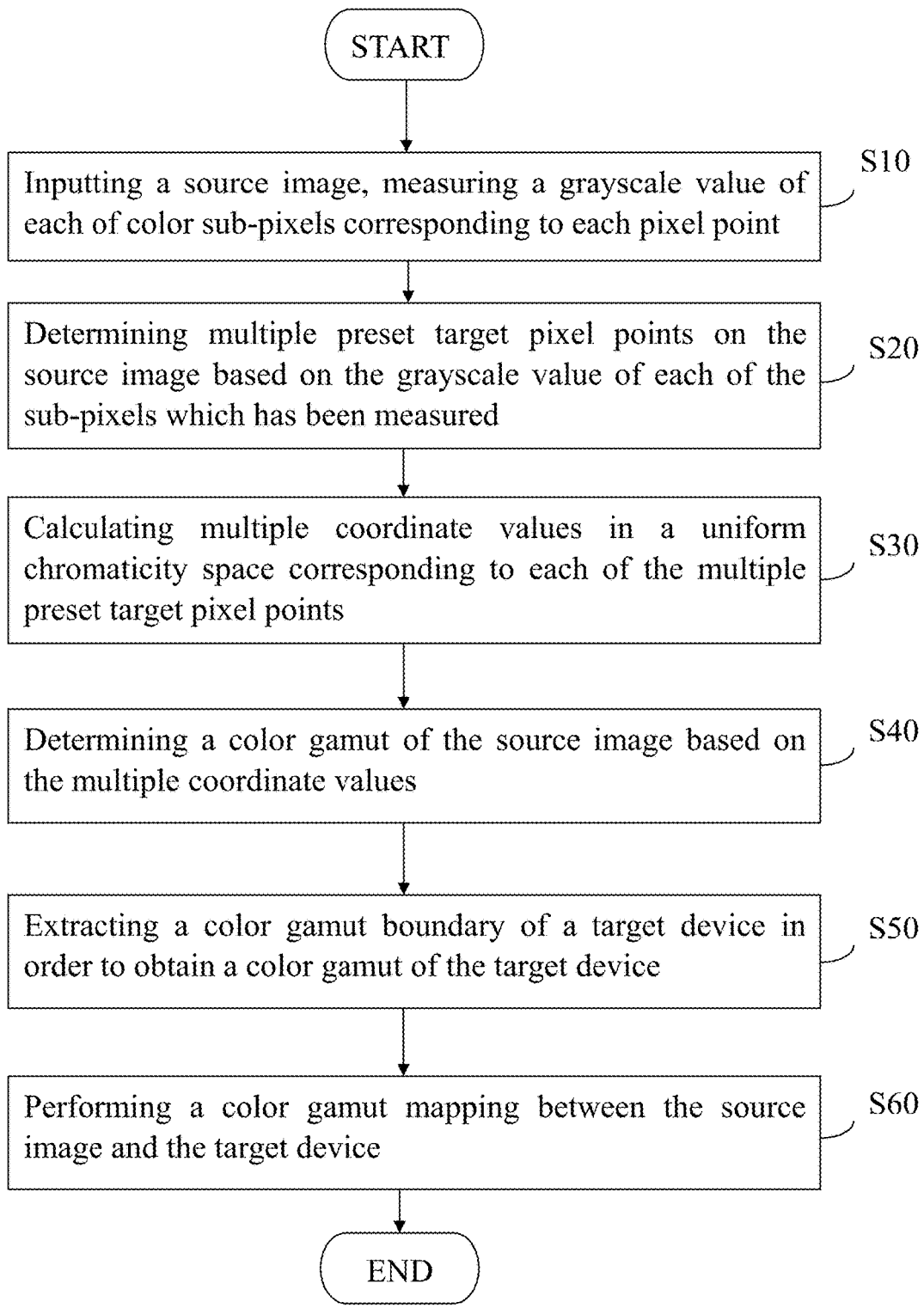
FIG. 1 is a flow chart of a color gamut mapping method based on a color gamut of a source image according to an embodiment of the present invention.

The following content combines figures and embodiments for detail description of the present invention. A same reference numeral always indicates a same element.

In an uniform chromaticity space (such as CIELCh chromaticity space or CIELAB chromaticity space), because many images do not cover all of a color gamut, and only cover a portion of a color gamut, a color gamut mapping method according to an embodiment of the present invention can depends on a color gamut covered by a source image to perform a color gamut mapping. Accordingly, in a transfer and reproduce process of image colors, the loss is reduced, and a color gamut mapping effect is improved.

In the present invention, first of all, a mapping relation among a source image, a target device and a uniform chromaticity space is established. Then, a color gamut mapping of the source image and the target device is performed in the uniform chromaticity space.

FIG. 1 is a flow chart of a color gamut mapping method based on a color gamut of a source image according to an embodiment of the present invention.

With reference to FIG. 1, in a step S10, inputting a source image, measuring a grayscale value of each of color sub-pixels corresponding to each pixel point. Here, the grayscale value of each of color sub-pixels corresponding to each pixel point can be measured by various conventional methods and devices. Preferably, the color sub-pixels include a red sub-pixel, a green sub-pixel, and a blue sub-pixel. The grayscale values of the red R sub-pixel, the green sub-pixel, and the blue sub-pixel corresponding to each pixel point on the source image can be measured.

In a step S20, determining multiple preset target pixel points on the source image based on the grayscale value of each of the sub-pixels which has been measured. Preferably, the multiple preset target pixel points includes six preset target pixel points, and the multiple preset target pixel points respectively correspond to vertexes of pure colors of six base colors in an uniform chromaticity space. Here, the six primary colors includes: a red color R, a green color G, a blue color B, a cyan color C, a magenta color M, a yellow color Y.

Here, because the source image itself does not includes all combinations of 0~255 grayscale value of the red sub-pixel, the green sub-pixel, and the blue sub-pixel, in order to reduce the amount of calculation for determining a color gamut of the source image, in the embodiment of the present invention, only the multiple preset target pixel points on the source image should be determined. Then, only multiple coordinate values in the uniform chromaticity space corresponding to the multiple preset target pixel points should be calculated so that the amount of calculation can be effectively reduced.

Specifically, in the step of determining multiple preset target pixel points on the source image based on the grayscale value of each of the sub-pixels which has been measured includes: setting a pixel point that the grayscale value of a red sub-pixel R is maximum, the grayscale value of a green sub-pixel G is zero, and the grayscale value of a blue sub-pixel B is zero as a first preset target point (corresponding to a vertex of a red color in the uniform chromaticity space). Setting a pixel point that the grayscale value of a green sub-pixel G is maximum, the grayscale value of a red sub-pixel R is zero, and the grayscale value of a blue sub-pixel B is zero as a second preset target point (corresponding to a vertex of a green color in the uniform chromaticity space).

Setting a pixel point that the grayscale value of a blue sub-pixel B is maximum, the grayscale value of a red sub-pixel R is zero, and the grayscale value of a green sub-pixel G is zero as a third preset target point (corresponding to a vertex of a blue color in the uniform chromaticity space). Here, person skilled in the art can understand that using the first preset target pixel point as an example, when the grayscale value of the red sub-pixel is maximum, the grayscale value of the green sub-pixel G and the grayscale value of the blue sub-pixel B may not be equal to zero, and only requiring that the grayscale value of the green sub-pixel G and the grayscale value of the blue sub-pixel B are approximately equal to zero.

Optionally, calculating a maximum value of a formula of Gray(G)+Gray(B)−Gray(R), and setting a pixel point corresponding to the maximum value of the formula of Gray(G)+Gray(B)−Gray(R) as a fourth preset target pixel point (corresponding to a vertex of a cyan color in the uniform chromaticity space). Here, Gray(G) represents the grayscale value of the green sub-pixel, the Gray(B) represents the grayscale value of the blue sub-pixel, and Gray(R) represents the grayscale value of the red sub-pixel. Calculating a maximum value of a formula of Gray(R)+Gray(B)−Gray(G), and setting a pixel point corresponding to the maximum value of the formula of Gray(R)+Gray(B)−Gray(G) as a fifth preset target pixel point (corresponding to a vertex of a magenta color in the uniform chromaticity space). Calculating a maximum value of a formula of Gray(R)+Gray(G)−Gray(B), and setting a pixel point corresponding to the maximum value of the formula of Gray(R)+Gray(G)−Gray(B) as a sixth preset target pixel point (corresponding to a vertex of a yellow color in the uniform chromaticity space).

In a step S30, calculating multiple coordinate values L*, a*, and b* in a uniform chromaticity space corresponding to each of the multiple preset target pixel points. Here, the L* presents a lightness (value) index, and a* and b* represent chromaticity indexes. Here, various conventional methods can be used to calculate coordinate values corresponding to pixel points in the uniform chromaticity space, and the present embodiment does not repeat.

In a step S40, determining a color gamut of the source image based on the multiple coordinate values.

Optionally, in the step of determining a color gamut of the source image based on the multiple coordinate values includes in the uniform chromaticity space, connecting multiple points corresponding to the multiple coordinate values, and setting a region surrounded and connected by the multiple points as the color gamut of the source image.

Figure 2:
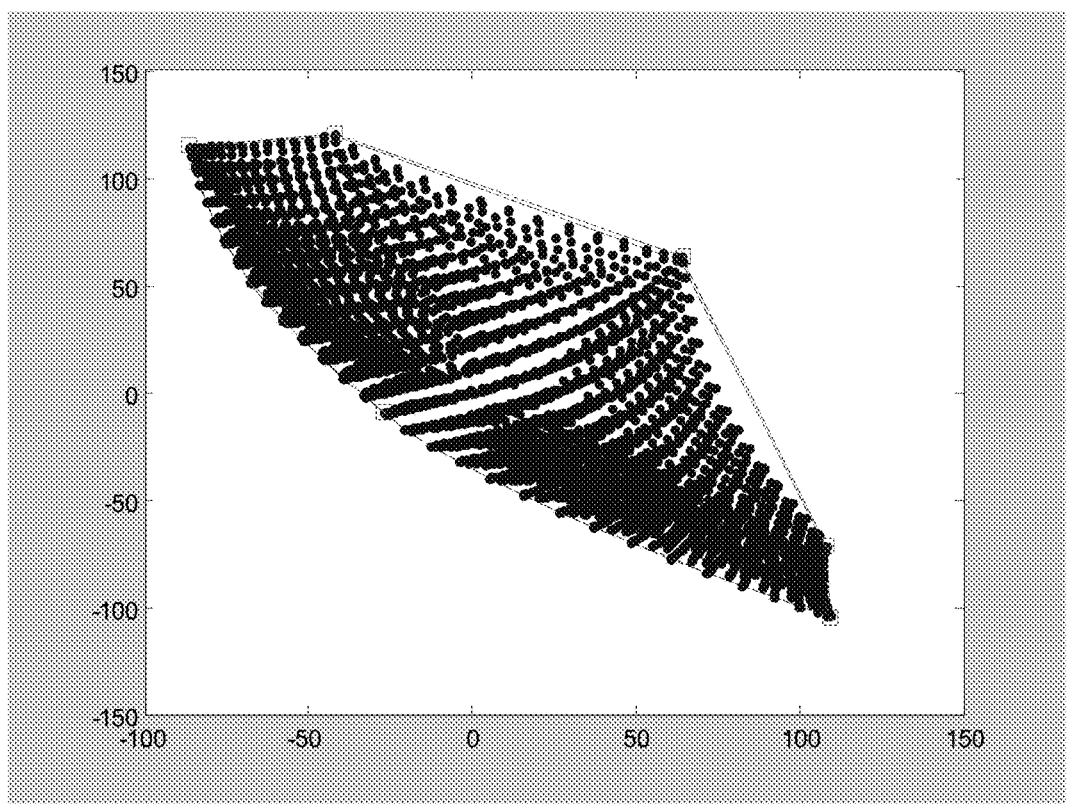
FIG. 2 is a chromaticity diagram of a-b plane of CIELab chromaticity space according to an embodiment of the present invention.

FIG. 2 is a chromaticity diagram of a-b plane of CIELab (CIE 1976 (L*, a*, b*)) chromaticity space according to an embodiment of the present invention.

As shown in FIG. 2, six marked points (each is shown by a rectangular point) are vertex of pure colors of six base colors in the uniform chromaticity space. A region surrounded and connected by the six vertexes is the color gamut of the source image. The present invention only requires calculating grayscale values of the red color sub-pixel, the green color sub-pixel, and the blue color sub-pixel of each pixel point of the source image to determine the multiple preset target pixel points. Then, the present invention only requires describing the multiple preset target pixel points on the uniform chromaticity space without describing each pixel point of the source image on the uniform chromaticity space, the amount of calculation is greatly reduced. The mapping efficiency between a color gamut of a source image and a color gamut of a target device is increased.

A two-dimensional color gamut having equal lightness means that under a fixed brightness, a range of a color gamut of an image of a device. Usually, the two-dimensional color gamut having equal lightness is described in CIELAB space. Assigning an L* value and obtaining a range of a color gamut of a-b plane.

Return to FIG. 1, in a step S50, extracting a color gamut boundary of a target device in order to obtain a color gamut of the target device. Here, various conventional methods can be used to extract a color gamut boundary of the target device. Here, the color gamut of the present invention means that in the uniform chromaticity space, a range of a boundary of a color gamut of a-b plane when assigning an L* value.

In a step S60, performing a color gamut mapping between the source image and the target device.

Here, various conventional color gamut mapping methods can be used to perform a color gamut mapping between the source image and the target device. As an example, using a gamut clipping method or a gamut compression method for performing the color gamut mapping between the source image and the target device. It can be understood that the gamut clipping method and the gamut compression method are common knowledge in this field. The present embodiment does not repeat anymore.

Utilizing a color gamut mapping method based on a color gamut of a source image of the present invention, without depending a color gamut of a source device, a mapping between a color gamut of a source image and a color gamut of a target is adopted such that in a transfer and reproduce process of image colors, the loss is reduced so as to improve the effect of the color gamut mapping.

Utilizing the above color gamut mapping method, depending on the color gamut of the source image to perform a color gamut mapping, measuring tri-stimulus of each grayscale value of all pixel points on a source image is not required in order to quickly determine a color gamut of a source image, greatly reduce the amount of calculation.

Besides, a color gamut mapping method based on a color gamut of a source image of the present invention, without measuring tri-stimulus values of each grayscale value of all pixel points on a source image, and without describing each pixel point in the uniform chromaticity space in order to realize quickly determining a color gamut of a source image, greatly reducing the amount of calculation.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A color gamut mapping method based on a color gamut of a source image, comprising following steps:
    step (a) inputting a source image, measuring a grayscale value of each of color sub-pixels corresponding to each pixel point;
    step (b) determining multiple preset target pixel points on the source image based on the grayscale value of each of the color sub-pixels which has been measured;
    step (c) calculating multiple coordinate values in a uniform chromaticity space corresponding to each of the multiple preset target pixel points;
    step (d) determining a color gamut of the source image based on the multiple coordinate values;
    step (e) extracting a color gamut boundary of a target device in order to obtain a color gamut of the target device; and
    step (f) performing a color gamut mapping between the source image and the target device.

2. The method according to claim 1, wherein, the multiple preset target pixel points respectively correspond to vertexes of pure colors of six primary colors in the uniform chromaticity space, and the six primary colors include: a red color, a green color, a blue color, a cyan color, a magenta color, and a yellow color.

3. The method according to claim 1, wherein, the multiple preset target pixel points includes six preset target pixel points, the color sub-pixels includes a red color sub-pixel, a green color sub-pixel and a blue color sub-pixel, and the step (b) includes steps of:
    (b1) setting a pixel point that the grayscale value of a red color sub-pixel is maximum, the grayscale value of a green color sub-pixel is zero, and the grayscale value of a blue sub-pixel is zero as a first preset target pixel point;
    (b2) setting a pixel point that the grayscale value of a green color sub-pixel is maximum, the grayscale value of a red color sub-pixel is zero, and the grayscale value of a blue sub-pixel is zero as a second preset target pixel point;
    (b3) setting a pixel point that the grayscale value of a blue color sub-pixel is maximum, the grayscale value of a red color sub-pixel is zero, and the grayscale value of a green sub-pixel is zero as a third preset target pixel point;
    (b4) calculating a maximum value of a formula of Gray(G)+Gray(B)−Gray(R), and setting a pixel point corresponding to the maximum value of the formula of Gray(G)+Gray(B)−Gray(R) as a fourth preset target pixel point;
    (b5) calculating a maximum value of a formula of Gray(R)+Gray(B)−Gray(G), and setting a pixel point corresponding to the maximum value of the formula of Gray(R)+Gray(B)−Gray(G) as a fifth preset target pixel point; and
    (b6) calculating a maximum value of a formula of Gray(R)+Gray(G)−Gray(B), and setting a pixel point corresponding to the maximum value of the formula of Gray(R)+Gray(G)−Gray(B) as a sixth preset target pixel point.

4. The method according to claim 1, wherein, the step (d) includes: in the uniform chromaticity space, connecting multiple points corresponding to the multiple coordinate values, and setting a region surrounded and connected by the multiple points as the color gamut of the source image.

5. The method according to claim 1, wherein, the step (f) includes: using a gamut clipping method or a gamut compression method for performing the color gamut mapping between the source image and the target device.

* * * * *